(12) United States Patent
Coleman

(10) Patent No.: US 11,788,937 B2
(45) Date of Patent: Oct. 17, 2023

(54) APPARATUS AND METHODS FOR GAS SAMPLING CONTAINERS

(71) Applicant: Todd Matthew Coleman, Fairmount, IL (US)

(72) Inventor: Todd Matthew Coleman, Fairmount, IL (US)

(73) Assignee: Todd Coleman, Fairmount, IL (US)

( * ) Notice: Subject to any disclaimer, the term of this patent is extended or adjusted under 35 U.S.C. 154(b) by 558 days.

(21) Appl. No.: 16/972,096

(22) PCT Filed: Jun. 9, 2019

(86) PCT No.: PCT/US2019/036202
§ 371 (c)(1),
(2) Date: Dec. 4, 2020

(87) PCT Pub. No.: WO2019/237095
PCT Pub. Date: Dec. 12, 2019

(65) Prior Publication Data
US 2021/0255069 A1    Aug. 19, 2021

Related U.S. Application Data

(60) Provisional application No. 62/682,855, filed on Jun. 9, 2018.

(51) Int. Cl.
*G01N 1/22*    (2006.01)
*G01N 31/22*    (2006.01)
*G01N 1/24*    (2006.01)

(52) U.S. Cl.
CPC ..... *G01N 1/2294* (2013.01); *G01N 2001/248* (2013.01)

(58) Field of Classification Search
USPC .................................................. 73/19.01
See application file for complete search history.

(56) References Cited

U.S. PATENT DOCUMENTS

| | | | |
|---|---|---|---|
| 1,379,092 A | 5/1921 | Frank | |
| 4,108,327 A | 8/1978 | Shonerd et al. | |
| 4,202,470 A | 5/1980 | Fujii | |
| 4,548,509 A | 10/1985 | Parrott et al. | |
| 4,712,434 A | 12/1987 | Herwig et al. | |
| 5,470,535 A | 11/1995 | Ray et al. | |
| 5,600,075 A * | 2/1997 | Peterson | G01N 1/22 73/863.71 |
| 7,647,846 B2 * | 1/2010 | Coleman | G01N 1/2247 73/863.31 |
| 8,210,058 B2 | 7/2012 | Welker et al. | |
| 9,234,822 B2 | 1/2016 | Coleman et al. | |

(Continued)

FOREIGN PATENT DOCUMENTS

| | | |
|---|---|---|
| GB | 2330654 A | 4/1999 |
| WO | 2016175371 A1 | 11/2016 |

*Primary Examiner* — Clayton E. LaBalle
*Assistant Examiner* — Warren K Fenwick
(74) *Attorney, Agent, or Firm* — Matthew J Patterson

(57) ABSTRACT

Methods and systems for collecting, transporting and extracting high quality fluid samples for laboratory analyses are disclosed. The systems and methods disclosed are especially important for collecting fluid samples in a manner that most closely resembles the fluids as captured and safely maintains the samples during transportation and extraction at the laboratory.

15 Claims, 3 Drawing Sheets

(56) References Cited

U.S. PATENT DOCUMENTS

| | | | |
|---|---|---|---|
| 9,588,023 B2 * | 3/2017 | Coleman | G01N 1/22 |
| 9,983,103 B2 * | 5/2018 | Coleman | G01N 1/22 |
| 2004/0099068 A1 | 5/2004 | Welker | |
| 2006/0137479 A1 | 6/2006 | Gilbert | |
| 2009/0255672 A1 | 10/2009 | Simpson et al. | |
| 2014/0174208 A1 | 6/2014 | Coleman et al. | |

* cited by examiner

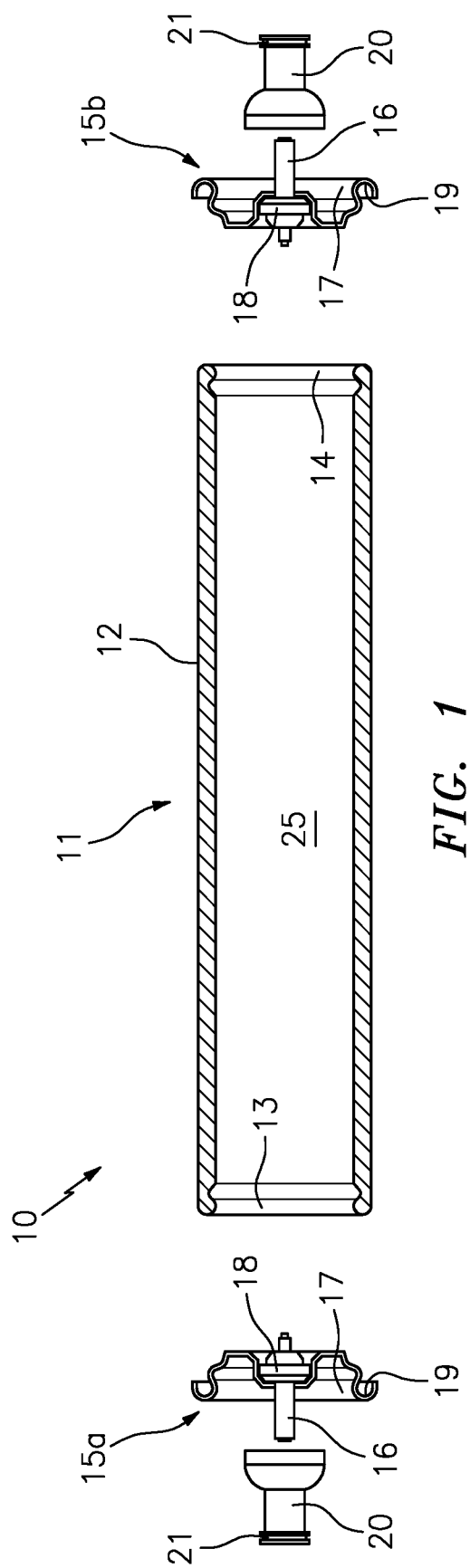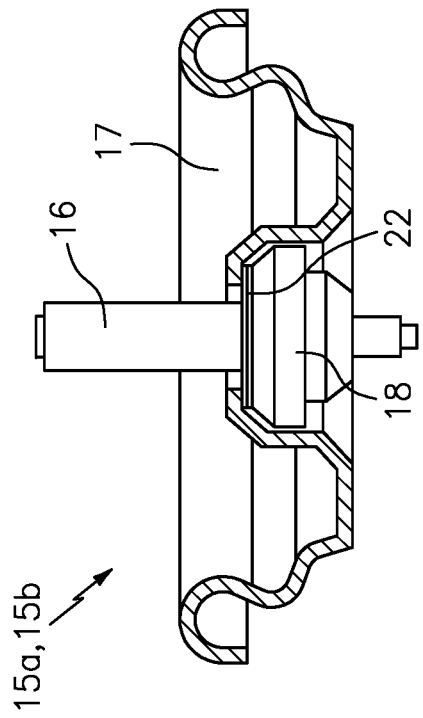

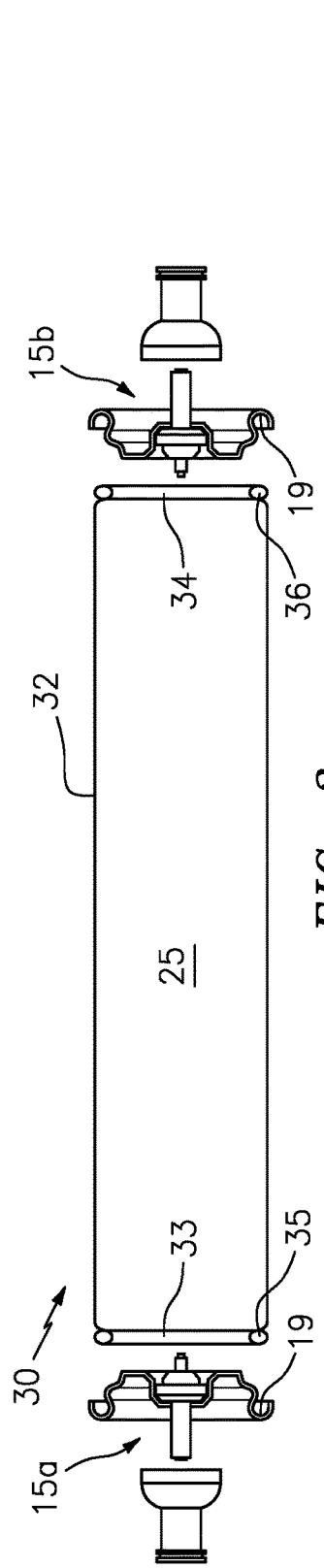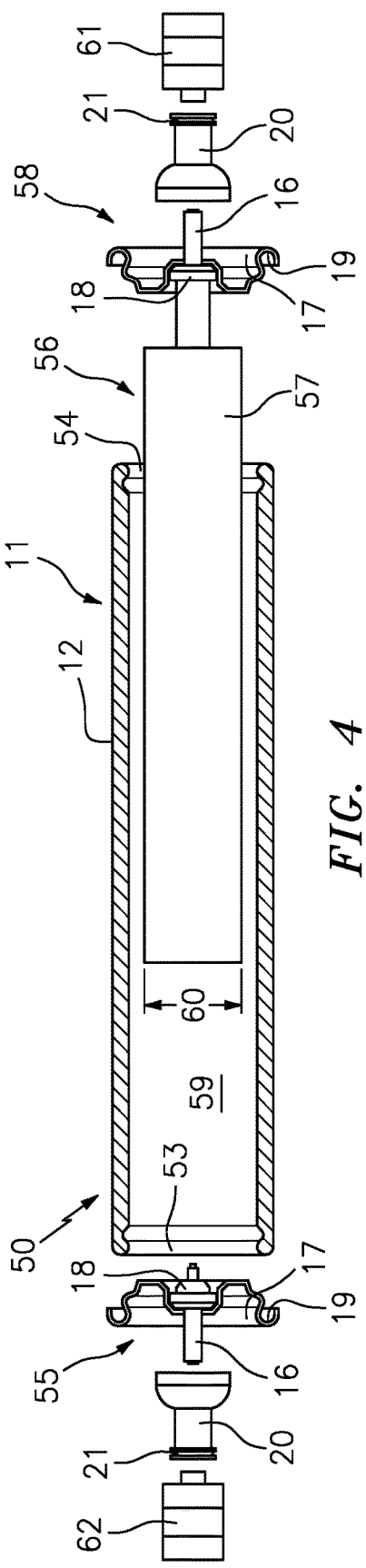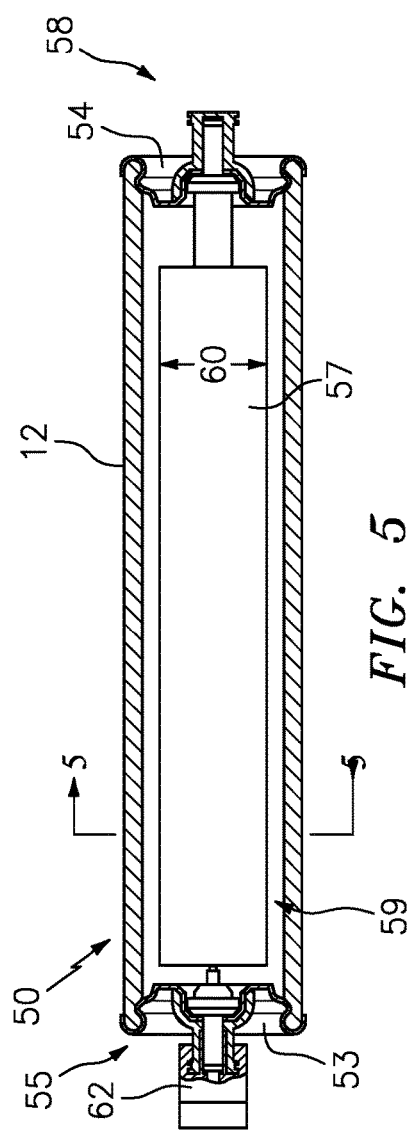

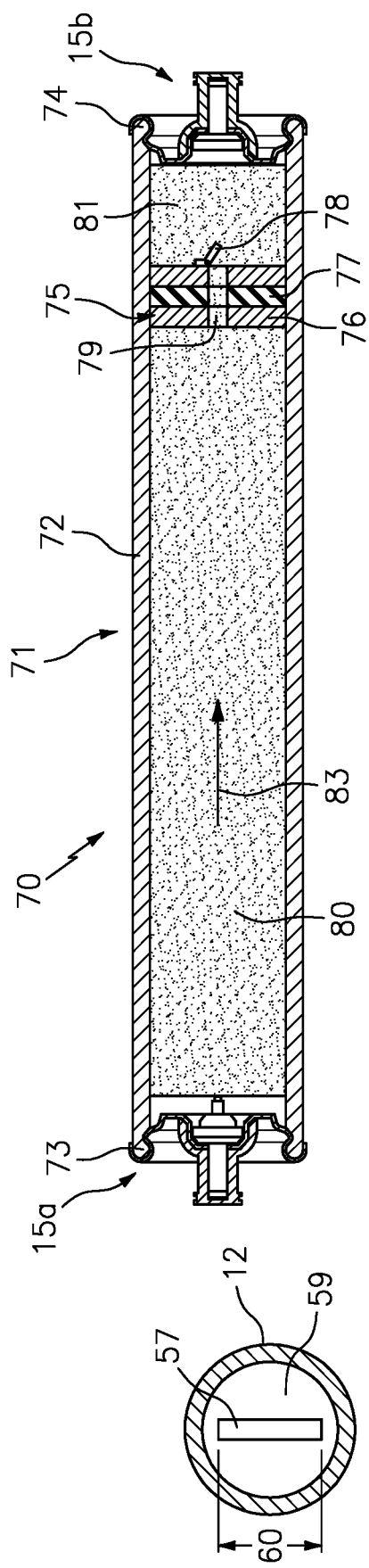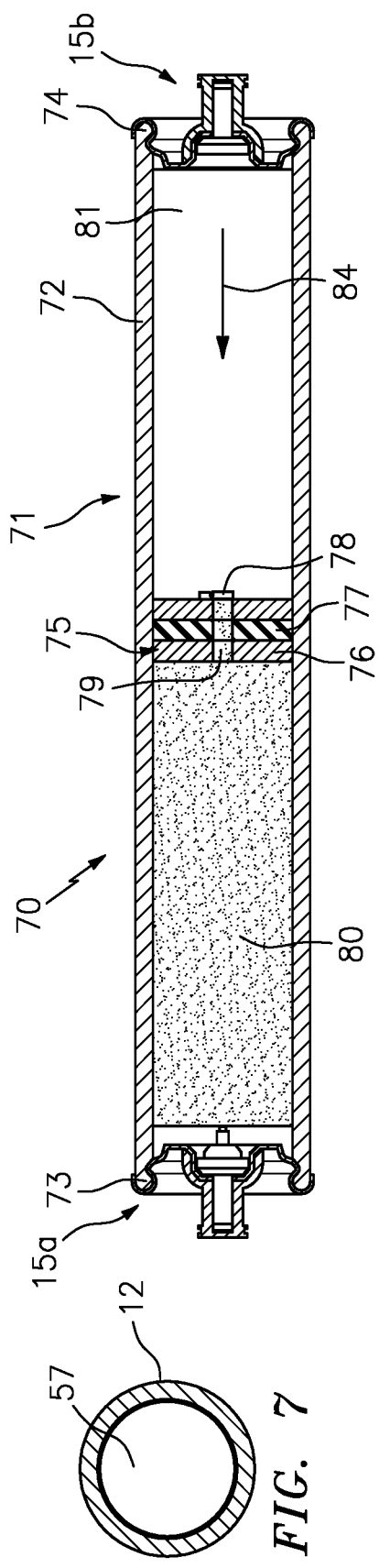

APPARATUS AND METHODS FOR GAS SAMPLING CONTAINERS

CROSS REFERENCE TO RELATED APPLICATIONS

This application claims the benefit of U.S. Provisional Patent Application Ser. No. 62/682,855 filed 9 Jun. 2018 as well as Patent Cooperation Treaty Patent Application Serial No. PCT/US2019/036202 filed 9 Jun. 2019. The disclosure of the applications above are incorporated herein by reference in their entirety.

BACKGROUND OF THE DISCLOSURE

Field of the Disclosure

Embodiments of the present disclosure generally relate to tools and techniques for collecting and testing pressurized and non-pressurized gas samples and, more particularly, to a novel gas sampling apparatus and method.

Description of the Related Art

In many industries, including the oil and gas industry, it is known that periodic sampling of gasses and fluids are performed. Specialized containers are utilized to capture and transport these sample gasses and sample fluids from the field to a laboratory for analyses. As used herein, gases are often specifically referred to, however other phases of matter included in the subset of fluids are included in gases such as liquids and other fluids.

Obtaining samples of reservoir fluids is commonly achieved by the use of special tools that are run into boreholes. A snorkel in the probe of the tool can be sealed to the formation at a station of interest, and has an internal conduit to a pump. The pump is used to lower the pressure in the conduit until fluid is induced to flow from the formation. The fluid is typically initially discharged to the well bore. Monitoring devices are used to ascertain the quality of the fluid that is being pumped, until at some point the fluid is transferred to a transportation vessel or sampling receptacle ("downhole bottle"). The downhole bottle is sealed, then recovered to surface. At the surface the downhole bottle is typically transported directly to a laboratory for analysis. Although particularly relevant to this disclosure, some prior art methods include having the sample transferred to another specialized container better suited to laboratory analyses and may further include having a small amount of sample withdrawn for immediate preliminary assessment.

The nature of well bore management is that the wellbore is filled with special fluids, commonly called 'mud'. This fluid is a mixture of chemicals, solids and oil or water. It is designed to maintain a pressure gradient such that at any depth in the borehole, the fluid pressure exceeds that of the reservoir. This prevents collapse of the wellbore, and uncontrolled production of reservoir fluids to surface. The fluid can have additional properties such as preventing chemical destabilization of the formation material.

It is known that the mud and reservoir fluids include a significant amount of gas dissolved in the fluid including sour gas (such as $H_2S$). This gas may have many components. When the fluid pressure is reduced below the bubble-point pressure of any of the gas components, such as while being pumped into a formation testing tool or downhole bottle, the gas will come out of solution. This gas can be extracted from the downhole bottles into the aforementioned specialized containers. In addition, gasses from the mud itself can be extracted and sampled while the mud is at the surface. The sample gasses can be collected from a mud pit where they will be at or near atmospheric conditions.

An example of such a specialized container is described in U.S. Pat. No. 9,234,822 ("the '822 patent"), the disclosure of which is incorporated herein in its entirety. The container of the '822 patent is a gas sampling device comprised of a metal tube with Schrader type valves positioned on either end and projecting outwardly therefrom. The container of the '822 patent is referred to as a "flow through" container wherein the container is positioned in an apparatus and the pair of Schrader valves are opened and the sampling gas is introduced through one of the valves to the inlet side of the bottle, flows into the bottle and flows out through the other valve on the outlet side of the bottle. The Schrader valves are then sequentially actuated to capture a volume of gas within the container (i.e. the gas sample). One known problem with the container of the '822 patent is that the valve is mounted to the outside of the container is vulnerable to be bent or even broken during handling and use.

One known problem of prior art gas sampling containers is that in order to safely maintain the gas sample in a non-contaminated state, the containers must be purged with a clean gas prior to use. This procedure can be time consuming and requires a specialized apparatus to ensure that the container is properly purged. Another problem of prior art gas sampling containers is that the entirety of the inside surface of the bottle is exposed to the gas sample and can render the entire sample and/or container non-reusable. Yet another known problem of the Schrader valves, also known as plunger type valves wherein a plunger interacts with a seat to enable fluid communication, is that they include various materials which may not be compatible with certain gasses and which gases may have deleterious effects on the valves and the safety of the fluid sampling containers themselves. It is also known that the Schrader type valves however, often have shards of metal that interfere with the seating surfaces of both the plunger-type valve seat and the Teflon barrel seal that the valve core uses to seal against the valve body walls. In summary, the valves as used in prior art gas sampling containers are complex, can include debris, are prone to leaking and can trap sampled gas therein.

It is therefore an object of the present disclosure to have a method and apparatus for obtaining pressurized or non-pressurized gas samples that will minimize operation time, reduce the complexity of the container, eliminate the need for purging the container and increase the ability to recycle the containers. It is another object of the present disclosure to provide a container with increased reliability such that the gas samples can be safely maintained throughout its journey from the transfer point to a laboratory. It is a further objective to minimize cost by implementing a novel fluid sampling container.

SUMMARY OF THE DISCLOSURE

One general aspect includes a fluid sample container that includes a tubular body having a cylindrical wall, a first open end and a second open end a first mounting cup sealably connected to the first open end a second mounting cup sealably connected to the second open end a first valve assembly positioned in the first mounting cup and adapted to be in selective fluid communication with the tubular body and a second valve assembly positioned in the second mounting cup and adapted to be in selective fluid communication with the tubular body.

Implementations may include one or more of the following features. The fluid sample container where the first valve assembly includes a first valve housing disposed within the tubular body, a first sealing element disposed between the first valve housing and the first mounting cup, and a first stem positioned at least partially outside of the tubular body and coupled to the first valve housing and the second valve assembly includes a second valve housing disposed within the tubular body, a second sealing element disposed between the second valve housing and the second mounting cup, and a second stem positioned at least partially outside of the tubular body and coupled to the second valve housing. The fluid sample container where the first valve assembly and the second valve assembly include a spring positioned therein to bias the first valve assembly and the second valve assembly into a closed position. The fluid sample container where the first stem is adapted to position the first valve assembly in fluid communication with the tubular body in an open position and the second stem is adapted to position the second valve assembly in fluid communication with the tubular body in an open position. The fluid sample container further including a flexible bag sealably fixed to, and in fluid communication with, one of the first valve assembly and the second valve assembly and positioned within the tubular body. The fluid sample container further including a piston assembly sealably slidably positioned within the tubular body, the piston assembly including a piston body having a piston outside diameter approximately equal to a tubular inside diameter of the tubular body. The fluid sample container where the piston assembly further included a sealing element positioned on the piston outside diameter and adapted to fluidically seal a sample gas volume in the tubular body from a buffer gas volume in the tubular body.

One general aspect includes a method of sampling a fluid, including providing a tubular body having a cylindrical wall, a first open end and a second open end connecting a first mounting cup to the first open end connecting a second mounting cup to the second open end positioning a first valve assembly in the first mounting cup and positioning a second valve assembly in the second mounting cup. coupling a fluid source to the first valve assembly and actuating the first valve assembly and the second valve assembly into an open position flowing a fluid from the fluid source through the first valve assembly, into the tubular body and through the second valve assembly actuating the second valve assembly to a closed position and actuating the first valve assembly to a closed position.

Implementations may include one or more of the following methods. The method further including coupling a fluid source to the first valve assembly, and actuating the first valve assembly and the second valve assembly into an open position flowing a fluid from the fluid source through the first valve assembly, into the tubular body and through the second valve assembly, actuating the second valve assembly to a closed position and actuating the first valve assembly to a closed position. The method further including coupling a flexible bag to the first valve assembly and positioning the flexible bag within the tubular body coupling a vacuum source to the first valve assembly and the second valve assembly actuating the first valve assembly and the second valve assembly into an open position evacuating the tubular body and the flexible bag and actuating the first valve assembly and the second valve assembly into a closed position. The method further including positioning a piston assembly within the tubular body and fluidically sealing a sample gas volume in the tubular body from a buffer gas volume in the tubular body, the piston assembly including a fill port and a check valve assembly to selectively seal the fill port coupling a buffer fluid source to the second valve assembly actuating the first valve assembly and the second valve assembly into an open position flowing a buffer fluid from the buffer fluid source through the second valve assembly and into the tubular body. opening the check valve assembly flowing fluid through the fill port and through the second valve assembly and actuating the first valve assembly and the second valve assembly into a closed position.

One general aspect includes a fluid sample container including a tubular body having a cylindrical wall, a first open end and a second open end a first valve housing sealably connected to the first open end a second valve housing sealably connected to the second open end a first aerosol valve connected to the first valve housing and adapted to be in selective fluid communication with the tubular body and a second aerosol valve connected to the second valve housing and adapted to be in selective fluid communication with the tubular body.

One general aspect includes a method of sampling a fluid, including providing a tubular body having a cylindrical wall, a first open end and a second open end connecting a first aerosol valve having a first actuator to the first open end and in selective fluid communication with the tubular body connecting a second aerosol valve having a second actuator to the second open end and in selective fluid communication with the tubular body coupling the first aerosol valve to a fluid source and depressing the first actuator and the second actuator to supply a fluid from the fluid source to the tubular body.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 is a cross section exploded view of a fluid sampling container in accordance with certain aspects of the present disclosure.

FIG. 2 is a cross section view of an end and valve assembly of a fluid sampling container in accordance with certain aspects of the present disclosure.

FIG. 3 is a cross section view of a fluid sampling container in accordance with certain aspects of the present disclosure.

FIG. 4 is a cross section exploded view of a fluid sampling container in accordance with certain aspects of the present disclosure.

FIG. 5 is a cross section view of a fluid sampling container in accordance with certain aspects of the present disclosure.

FIG. 6 is a cross section view of the fluid sampling container of FIG. 5 taken substantially along plane 4-4.

FIG. 7 is the cross-section view of a fluid sampling container of FIG. 6 with the sample bag in the filled condition in accordance with certain aspects of the present disclosure.

FIG. 8 is a cross section view of a fluid sampling container in accordance with certain aspects of the present disclosure.

FIG. 9 is a cross section view of a fluid sampling container in accordance with certain aspects of the present disclosure.

DETAILED DESCRIPTION

The present disclosure is related to a pressurized or non-pressurized; gas sampling container (gas sampling container) which can be used for collecting high quality samples of fluids, including gases and liquids. The gas sampling container includes a novel valving arrangement and sample communication devices. Certain embodiments of the gas sampling container of the present disclosure further include a bag-in-container arrangement.

Examples of Containers for Collecting High Quality Gas Samples

With reference to FIG. 1 there is shown an embodiment of a gas sampling container 10 of the present disclosure. Gas sampling container 10 includes a tubular body 11 having a cylindrical wall 12 and a first open end 13 and a second open end 14. It should be appreciated by those skilled in the art that in this particular embodiment first and second ends 13, 14 can be identical and either could be used as an inlet or an outlet or could variously be both an inlet and an outlet as will more fully described herein after. Tubular body 11 can be comprised of any suitable material capable of withstanding the pressures contemplated by the present disclosure including metals, plastics and composite materials and can be opaque, translucent or transparent. Gas sampling container 10 includes a valve assembly 15a positioned in end 13, and 15b positioned in end 14.

Now with reference to FIG. 2, there is shown valve assembly 15a, identical to 15b in this embodiment, in a partial cross-sectional detail including hollow valve stem 16, sealably positioned within mounting cup 17 by sealing element 22 and valve housing 18. Chime 19 is formed in the outer rim of mounting cup 17 for assembly to tubular body 11 as will be described in more detail herein after. In the embodiment shown, valve housing 18 is in the closed position such that there is no fluid communication through valve stem 16. Valve assembly 15a, 15b are similar to an aerosol valve and when valve stem 16 is depressed, or actuated, valve housing 18 moves to an open position, unsealing sealing element 22 from its seat against mounting cup 17 and exposing ports (not shown) in the stem and thereby direct fluid communication through the valve stem 16 is enabled in the open position. Valve housing includes a spring (not shown) to bias the sealing element 22 against mounting cup 17 when stem 16 is released thereby sealing off the ports in the stem in this closed position. Sealing element 22 can comprise any suitable element including O-rings and the like. These "ported" aerosol valve assemblies 15a, 15b can be comprised of molded plastic, which are cleaner than the plunger type valve assemblies of the prior art and tend not to have artifacts from the manufacturing process that can interfere with the valve's function. It has been discovered that the use of valves 15a, 15b is advantageous in embodiments of gas sampling containers disclosed herein because the flow path is free of the springs and other components of prior art valves that can cause the deleterious effects as described herein before. Such ported aerosol valve assemblies 15a, 15b are similar to those known in the art and an exemplary valve is a continuous press-down valve available from Coster Tecnologie Speciali S.p.A. Such valves operate when pressure on the stem 16 causes the opening of the valve housing 18 and the fluid communication directly through the stem. The valve assembly 15a functions regardless of orientation. Other types of aerosol valves exist and are contemplated by the present disclosure to the extent that such non-ported aerosol valves overcome the aforementioned deficiencies of plunger and seat type valves in the prior art.

Referring back to FIG. 1, in the embodiment of gas sampling container 10 shown, the ends 13, 14 of cylindrical wall 12 are adapted to receive a chime 19 of mounting cup 17 to sealably affix valve assembly 15 to tubular body 11 by crimping chime 19 over the end of cylindrical wall 12 thereby forming a crimped seal. Although shown as a crimped seal, other methods of joining valve assemblies 15 to tubular are contemplated by the present disclosure such as a screw joint, a press fit, welding, gluing and other known methods of sealable attachment wherein the joint can be machined as might be the case with a plastic tube, or thicker walled aluminum tubing. Still referring to FIG. 1, gas sampling container 10 further includes hollow actuator 20 adapted to be press fit over valve stem 16. In the embodiment shown, actuator 20 further includes a thread 21 positioned on it for affixing the adapter to an apparatus (not shown) for filling or emptying gas sampling container 10. Thread 21 can be any known type of attachment feature depending on the mating features of the filling or emptying apparatus and may advantageously be a quick disconnect type such as a Luer lock type fitting. Once gas sampling container 10 is assembled as described immediately herein above interior volume 25 of the gas sampling container is selectively sealed from the outside environment.

Now referring to FIG. 3, there is shown an alternative embodiment gas sampling container 30 of the present disclosure. Gas sampling container 30 includes a tubular body 31 having a cylindrical wall 32 and a first open end 33 and a second open end 34. Tubular body 31 can be comprised of any suitable material capable of withstanding the pressures contemplated by the present disclosure including metals, plastics and composite materials and can be opaque, translucent or transparent. In one embodiment of the present disclosure, tubular body 31 is comprised of a steel that starts as a flat sheet, which is then rolled and welded into a tube. This weld forms a seam that runs the vertical length of the tubular body (not shown). Other described as formed by rolling, tubular body 31 can be formed by any known method including machining, extruding, casting, molding, and the like. Ends 33, 34 include rolled edges 35, 36 that are formed by rolling the ends of tubular body 31. Similar to gas sample container 10 (FIG. 1), gas sampling container 30 includes a valve assembly 15a positioned in end 33, and 15b positioned in end 34. In this particular embodiment, chime 19 of valve assembly 15a, 15b are rolled over rolled edges 35, 36 to form a selectively sealed interior volume. Other sizes and shapes of tubular bodies and seal housings can be achieved without departing from the scope of by the present disclosure. Still other embodiments include an extruded aluminum tubular body in which include rolled ends to which the chimes attach to on both ends of the tubular body.

In operation, and assembled as described hereinabove, gas sampling container 10 can be prepared for collecting a gas sample by evacuation or purging. To evacuate gas sampling container 10, a vacuum source (not shown) is sealably attached to at least one of the actuators 20 of valve assembly 15a, 15b, the actuator is depressed thereby opening the respective valve housing 18 and establishing selective fluid communication with the vacuum source. The vacuum source applies a vacuum for a sufficient amount of time to reduce the pressure within gas sampling container 10 to a preselected level. The at least one actuators 20 are released and thereby closing valve housing and sealing gas sampling container 10 with an internal pressure less than that of atmospheric pressure.

In certain circumstances interior volume 25 of gas sampling container 10 will need to be purged, as it can initially contain air or other gas, to prepare it for the safe introduction of a sample gas which may be flammable. During the purging operation, the interior of gas sampling container 10 can be flushed with an inert gas, such as Argon, to reduce the concentration of oxygen so that when a flammable sample gas is admitted, an ignitable mixture cannot form. To purge interior volume 25 of gas sampling container 10, a purging fluid source (not shown) capable of providing an inert gas, or other purging fluid, is sealably attached to actuator 20 of valve assembly 15a, the actuator is depressed thereby opening its respective valve housing 18 and establishing selective fluid communication with the purge gas source. Actuator 20 of valve assembly 15b is then depressed opening the other valve housing 18, which may or may not be attached to other equipment. The purge gas source introduces a purging gas to interior volume 25 of gas sampling container 10 through of valve assembly 15a and the purging gas flows out of valve assembly 15b for a sufficient amount of time (or volume) to render interior volume 25 of gas sampling container 10 safe. The actuators 20 are released, thereby closing the valve housings 15a, 15b and sealing the inert gas within gas sampling container 10.

In the sample collection operation, a previously gathered gas sample, as described herein above, can be collected within gas sampling container 10 by sealably connecting the sample fluid source of the gas to be sampled (not shown) to actuator 20 of valve assembly 15a and sealably connecting a collection system (not shown) to actuator 20 of valve assembly 15b. The actuators 20 are then depressed thereby opening valve housings 18 and establishing selective fluid communication with the sample fluid source and the collection system. The sample fluid source introduces the sampling gas into interior volume 25 of gas sampling container 10 through actuator 20 of valve assembly 15a and the sampling gas flows out of the actuator 20 of valve assembly 15b and into the collection system for a sufficient amount of time (or volume) to fill interior volume 25 of gas sampling container 10 with the sampling gas. Actuator 20 of valve assembly 15b attached to the collection system is released and thereby closing the valve housing 18. If desired, the pressure of the sampling gas source can be raised to provide an over pressure condition within gas sampling container 10. Once gas sampling container 10 is filled with the sample gas, actuator 20 of valve assembly 15a attached to the sampling gas source is released thereby closing valve housing 18 and sealing the gas sample within interior volume 25 of the gas sampling container.

In the sample extraction operation, the sample gas previously collected within gas sampling container 10 as described directly herein above, can safely be extracted for analysis in a laboratory setting. An extraction apparatus (not shown) is sealably connected to the actuators 20 of gas sampling container. The actuators 20 are depressed thereby opening respective valve housings 18 and establishing selective fluid communication with extraction apparatus. The sample gas is extracted from at least one end of gas sampling container 10 and presented for laboratory analyses as is known in the art.

With reference now to FIGS. 4 and 5, there is shown another embodiment of a bag-in-tube gas sampling container 50 of the present disclosure. Similar to that described herein before with reference to gas sampling container 10, gas sampling container 50 includes a tubular body 11 having a cylindrical wall 12, open pressure end 53 and open sample end 54. Tubular body 11 can be comprised of any suitable material capable of withstanding the pressures contemplated by the present disclosure including metals, plastics and composite materials and can be opaque, translucent or transparent. Gas sampling container 50 includes a pressure valve assembly 55 sealably positioned in open pressure end 53 wherein pressure valve assembly 55 can be the same as that described herein above with reference to valve assemblies 15a, 15b of FIG. 2. Gas sampling container 50 further includes bag on valve assembly 56 sealably disposed in open sample end 54. Bag on valve assembly 56 comprises a flexible bag 57 sealably fixed to valve assembly 58 wherein valve assembly 58 can be the same as that described herein above with reference to valve assembly 15a, 15b of FIG. 2. Such bag on valve assemblies 56 are known in the art and an exemplary bag on valve available from Coster Tecnologie Speciali S.p.A. having a continuous press-down valve as described above. In FIGS. 4, 5 and 6, flexible bag 57 is shown in an unfilled condition wherein the width 60 of the bag is indicated by the arrow. Flexible bag 57 may be comprised of any material suitable to be impervious to the gas to be sampled and flexible enough to fill the interior volume 59 of gas sampling container 50 when filled as will be more fully described herein after. In addition, although bag 57 is shown as rectangular in the unfilled condition, it can be round or other shapes without departing from the present disclosure. In this particular embodiment, gas sampling container 50 comprises a fixed volume interior defined by cylindrical wall 12 pressure valve assembly 55 and bag on valve assembly 56. The fixed volume interior is comprised of two separate variable volume compartments. The two variable volume compartments are sensibly the volume of bag 57 and the interior volume 59. The maximum interior volume is the total interior volume minus the unfilled volume of the bag 57. The minimum volume of interior volume is sensibly zero when bag 57 is filled as will be described more fully herein after. Similar to the embodiment of gas sampling container 10 shown with reference to FIG. 1, the ends of cylindrical wall 12 are adapted to receive a chime 19 (or machined edge) of mounting cup 17 to sealably affix valve assemblies 55, 58 to tubular body 11 by crimping chime 19 over the end of cylindrical wall 12 thereby forming a crimped seal. Similarly, although shown as a crimped seal, other methods of joining the valve assemblies 55, 58 to tubular body 11 are contemplated by the present disclosure such as a screw joint, a press fit, welding, gluing and other known methods of sealable attachment. It should be appreciated that embodiments wherein valve assembly 58 is removably sealably attached to tubular body 11, the bag on valve assembly 56 could be removed after use and the remainder of gas sampling container 50 could be recycled by refitting it with another valve on bag assembly. Also shown in this embodiment are optional valve caps 61, 62 that can cooperate with thread 21 to seal off the end of actuator 20 in to prevent an unanticipated actuation of the valve housing 18 thereby precluding inadvertent release of pressure or gas.

In operation, gas sampling container 50 can be prepared for collecting a gas sample by evacuation of interior volume 59. To evacuate interior volume 59, a vacuum source (not shown) is sealably attached to actuator 20 on pressure valve assembly 55, the actuator is depressed thereby opening valve housing 18 and establishing selective fluid communication between interior volume 59 and the vacuum source. Once interior volume 59 is evacuated, valve assembly 55 can be closed and the vacuum source can be disconnected. Interior volume 59 then remains under vacuum (relative to atmospheric pressure). In this embodiment bag 57 is also evacuated using a vacuum source (not shown) applied to valve assembly 5, which evacuation can occur before or after assembly into tubular body 11. Valve assembly 58 is disconnected from the vacuum source and container 50 is prepared to accept a sample. With interior volume 59 and bag 57 in the evacuated condition described above, valve assembly 58 can be attached to a sampling source and a sample gas can be pulled into the bag by depressing sample end actuator 20. Vacuum from 59 will then "pull" sample into the bag. Unlike prior art bag-on-valve assemblies (i.e. consumer aerosol cans) where a propellant or pressurized gas is placed in the interior volume, the embodiment shown places interior volume 59 in a negative pressure condition.

Prior to the collection of a gas sample and with interior volume 59 and bag 57 in an evacuated condition, the bag has the shape and configuration shown in FIG. 6. As described herein above, in filling bag 57 with a sample gas actuator 20 of valve assembly 58 is depressed thereby opening valve housing 18 and establishing selective fluid communication with the gas source and bag 57 of bag on valve assembly 56. With interior space 59 at partial vacuum, it together with bag 57 act as a negative displacement pump and together with the pressure of the sample gas (if above atmospheric the pressure of interior volume 59) draws the sampling gas from the gas source into bag 57. This negative displacement pumping action is advantageous in conditions where the gas source is at or near atmospheric pressure conditions. The sampling gas is allowed to flow into bag 57 for a sufficient amount of time (or volume) to at least partially fill the bag 57 and if the bag is full, the bag will press against cylindrical wall 12. In this filled condition, bag 57 is at its maximum volume wherein its outside diameter is the same as the inside diameter of tubular body 11 and the interior volume 59 will sensibly be at zero as shown in FIG. 7. After filling is complete, actuator 20 attached to valve assembly 58 is released and thereby closing the valve housing 18 sealing the gas sample within bag 57. If desired, the pressure of the gas sample can be increased by supplying an external pressure source to actuator 20 of valve assembly 55. It should be appreciated by those skilled in the art that in this particular inventive embodiment, the volume for the sample gas is separated from the interior volume 59 and the sample gas does not come in contact with any of the interior surfaces cylindrical wall 12 or cups 17 (FIG. 1). This can be particularly important for the sampling of gases that can interact with certain materials. The interaction of the gases with the interior surfaces cylindrical wall 12 or cups 17 could compromise the structural integrity of the gas sampling container 50 and the gas sample itself. It should be further appreciated by those skilled in the art that in embodiments where tubular body 11 is comprised of a transparent material, a visual indication of the fill condition of bag 57 will be readily apparent. Once bag 57 is filled optional end caps 61, 62 can be applied to actuators 20 to prevent the inadvertent release of the sample gas.

The negative displacement pumping action of gas sampling container 50 can advantageously be used in any application where it is desirable to capture a sample of a gas, especially at relatively low pressures, and preserve its integrity during transportation to a remote site for analysis. Such applications include, but are not limited to, air monitoring, $CO_2$ capture, landfill gas monitoring, human breath studies, and drug and alcohol testing.

In the sample extraction operation, the sample gas previously collected within gas sampling container 50 as described directly herein above, can safely be extracted for analysis in a laboratory setting. An extraction apparatus (not shown) is sealably connected to the actuators 20 of gas sampling container 50. Actuator 20 of valve assembly 58 is then depressed thereby opening valve housing 18 and establishing selective fluid communication between bag 57 and the extraction apparatus. The sample gas is extracted from sample end 54 of gas sampling container 50 and presented for laboratory analyses as is known in the art. In addition, and inventively, the sample gas contents of bag 57 can be completely extracted by applying a positive pressure through valve assembly 55 and into interior volume 59.

Now with reference to FIGS. 8 and 9 there is shown an embodiment of a gas sampling container 70 of the present disclosure. Similar to gas sample container 10 (FIG. 1) gas sampling container 70 includes a tubular body 71 having a cylindrical wall 72 and a first open end 73 and a second open end 74. It should be appreciated by those skilled in the art that in this particular embodiment first and second ends 73, 74 can be identical and either could be used as an inlet or an outlet or could variously be both an inlet and an outlet as will more fully described herein after. It should be noted however, that the initial position of piston assembly 75 would determine the direction of flow for the collection of a gas sample, either from 15a to 15b or from 15b to 15a. Gas sampling container 70 includes a valve assembly 15a positioned in end 73, and 15b positioned in end 74. Gas sampling container 70 further includes piston assembly 75 slidably positioned within the interior of tubular body 71. Piston assembly 75 comprises a piston body 76, a seal 77, a fill port 79 and a check valve assembly 78. Check valve assembly 78 is shown as a flapper valve type check valve but can include any known check valve that provides selective fluid communication between the volumes. Check valve assembly 78 works to allow fluid flow through fill port 79 into buffer gas volume 81 in the fill direction 83 when in the open position (FIG. 8) and prevents fluid flow through fill port 79 into sample gas volume 80 in the pressurize direction 84 when in the closed position (FIG. 9). Piston body 76 is cylindrical in shape with a piston outside diameter that is slightly less than the interior diameter of tubular body 71 and includes features to accept seal 77. Piston assembly 75 is sealably slidably positioned within tubular body 11. In some embodiments seal 77 comprises an O-ring that is configured and sized to slidably and fluidically seal sample gas volume 80 from buffer gas volume 80 when check valve assembly 78 is in the closed position as will be more fully described herein after.

In the embodiment shown in FIGS. 8 and 9, gas sampling container 70 comprises a fixed volume interior defined by cylindrical wall 72 piston assembly 75. The fixed volume interior is comprised of two separate variable volume compartments. The two variable volume compartments are sample gas volume 80 and buffer gas volume 81. In the sample collection operation, a previously gathered gas sample, as described herein above, can be collected within gas sampling container 70 by sealably connecting the source of the gas to be sampled (not shown) to actuator 20 of valve assembly 15a and sealably connecting a pressurization system (not shown) to actuator 20 of valve assembly 15b. The actuators 20 are then depressed thereby opening valve housings 18 and establishing selective fluid communication with the sample gas source and the pressurization system. The pressurization system is configured to vary the pressure of buffer volume 81 from a partial vacuum pressure to some predetermined level of pressure above atmospheric pressure. The gas source introduces the sampling gas into sample gas volume 80 of gas sampling container 70 through actuator 20 of valve assembly 15a and the sampling gas flows through fill port 79 and check valve assembly 78 of piston assembly 75 and out of the actuator 20 of valve assembly 15b and into the pressurization system. It should be appreciated by those skilled in the art that the introduction of sample gas in the fill direction 83 urges piston assembly 75 in the fill direction increasing the sample gas volume 80 and decreasing the buffer volume 81.

Sample gas is permitted to flow in the fill direction 83 for a sufficient amount of time (or volume) to fill sample gas volume 80 of gas sampling container 70 with the sampling gas. Actuator 20 of valve assembly 15a attached to the sample gas source is released and thereby closing the valve housing 18 and closing check valve assembly 78. In certain embodiments, the pressure of the sampling gas source can be raised to provide an over pressure condition within gas sampling container 70 by introducing a buffer fluid into valve assembly 15b from the pressurization source wherein the pressurization source would comprise a buffer fluid source. It should be appreciated by those skilled in the art that with check valve assembly 78 in the closed position (FIG. 9) the introduction of buffer fluid in the buffer direction will urge piston assembly 75 to slide in the fill direction 84 and increase the buffer volume 81 and decrease the sample gas volume 80, increasing the pressure of the sample gas thereby. Check valve assembly 78 is selected to provide a closing bias force great enough to maintain a predetermined amount of a pressure differential between sample gas volume 80 and buffer volume 81 to prevent the check valve from leaking during subsequent transportation and other operations of gas sample container 70. Once gas sampling container 70 is filled with the sample gas and buffer fluid, actuator 20 of valve assembly 15b attached to the pressurization system is released thereby closing valve housing 18 and sealing the gas sample within sample gas volume 80 of the gas sampling container.

In the sample extraction operation, the sample gas previously collected within gas sampling container 70 as described directly herein above, can be safely extracted for analysis in a laboratory setting. An extraction apparatus (not shown) is sealably connected to the actuator 20 of valve assembly 15a of gas sampling container 70. An optional pressurization system (not shown) can be connected to actuator 20 of valve assembly 15b. The sample gas can be extracted from the valve assembly 15a by coordinating the extraction apparatus and the pressurization system to urge piston assembly 75 in the fill direction 84 to expel the sample gas from sample volume 80 and into the collection apparatus.

While the foregoing is directed to only certain embodiments of the present disclosure, certain observations of the breadth of the present disclosure should be made. Other and further embodiments of the disclosure may be devised without departing from the basic scope thereof, and the scope thereof is determined by the claims that follow.

What is claimed is:

1. A fluid sample container comprising:
   a tubular body having a cylindrical wall, a first open end and a second open end;
   a first mounting cup sealably connected to the first open end having a seal seat disposed on an inside surface thereof;
   a second mounting cup sealably connected to the second open end having a seal seat disposed on an inside surface thereof;
   a first valve assembly positioned in the first mounting cup and adapted to selectively seal against the seal seat and to provide selective fluid communication therethrough; and
   a second valve assembly positioned in the second mounting cup and adapted to selectively seal against the seal seat and to be in selective fluid communication with the tubular body.

2. The fluid sample container of claim 1 wherein:
   the first valve assembly comprises a first valve housing disposed within the tubular body, a first sealing element disposed between the first valve housing and the seal seat of the first mounting cup, and a first stem positioned at least partially outside of the tubular body and coupled to the first valve housing; and
   the second valve assembly comprises a second valve housing disposed within the tubular body, a second sealing element disposed between the seal seat of the second valve housing and the second mounting cup, and a second stem positioned at least partially outside of the tubular body and coupled to the second valve housing.

3. The fluid sample container of claim 2 wherein the first valve assembly includes a spring positioned therein to bias the first valve housing and the first sealing element against the seal seat of the first mounting cup in a closed position and the second valve assembly includes a spring positioned therein to bias the second valve the second valve housing and the second sealing element against the seal seat of the second mounting cup in a closed position.

4. The fluid sample container of claim 3 wherein the first stem is adapted to position the first valve assembly in an open position to provide fluid communication through the first valve assembly and the second stem is adapted to position the second valve assembly in an open position to provide fluid communication through the second valve assembly.

5. The fluid sample container of claim 4 further comprising a first quick disconnect fitting positioned on the first stem and a second quick disconnect fitting positioned on the second stem.

6. The fluid sample container of claim 4 further comprising a flexible bag sealably fixed to and in fluid communication with one of the first valve assembly and the second valve assembly and positioned within the tubular body.

7. The fluid sample container of claim 6 wherein the tubular body has a tubular inside diameter and the flexible bag has an outside diameter approximately equal to the tubular inside diameter in a filled condition.

8. The fluid sample container of claim 4 further comprising a piston assembly sealably slidably positioned within the tubular body, the piston assembly comprising:
   a piston body having a piston outside diameter approximately equal to a tubular inside diameter of the tubular body.

9. The fluid sample container of claim 8 wherein the piston assembly further comprises a sealing element positioned on the piston outside diameter and adapted to fluidically seal a sample gas volume in the tubular body from a buffer gas volume in the tubular body and wherein the piston assembly further comprises a fill port positioned therein and a check valve adapted to provide selective fluid communication between the sample gas volume and the buffer gas volume.

10. A method of sampling a fluid, comprising:
providing a tubular body having a cylindrical wall, a first open end and a second open end;
connecting a first mounting cup to the first open end having a seal seat disposed on an inside surface thereof;
connecting a second mounting cup to the second open end having a seal seat disposed on an inside surface thereof;
positioning a first valve assembly having a sealing element to seal against the seal seat in a closed position in the first mounting cup;
positioning a second valve assembly having a sealing element to seal against the seal seat in a closed position in the second mounting cup
coupling a fluid source to the first valve assembly;
depressing the first valve assembly and lifting the sealing element off the seal seat into an open position;
depressing the second valve assembly and lifting the sealing element off the seal seat into an open position;
flowing a fluid from the fluid source through the first valve assembly, into the tubular body and through the second valve assembly;
releasing the second valve assembly and biasing the sealing element against the seal seat into the closed position; and
releasing the first valve assembly and biasing the sealing element against the seal seat into the closed position.

11. The method of claim 10, further comprising uncoupling the fluid source from the first valve assembly.

12. The method of claim 10, further comprising:
positioning a piston assembly within the tubular body and fluidically sealing a sample gas volume in the tubular body from a buffer gas volume in the tubular body, the piston assembly including a fill port and a check valve assembly to selectively seal the fill port;
coupling a sample fluid source to the second valve assembly;
actuating the first valve assembly into the open position and actuating the second valve assembly into the open position;
flowing a sample fluid from the sample fluid source through the second valve assembly and into the tubular body;
opening the check valve assembly;
flowing the sample fluid through the fill port and through the first valve assembly; and
actuating the first valve assembly into the closed position and actuating the second valve assembly into the closed position.

13. The method of claim 12, further comprising:
closing the check valve assembly;
coupling a buffer fluid source to the first valve assembly;
actuating the first valve assembly and the second valve assembly into an open position;
flowing the buffer fluid from the buffer fluid source through the first valve assembly and into the buffer gas volume in the tubular body;
flowing the sample fluid through the second valve assembly; and
actuating the first valve assembly and the second valve assembly into a closed position.

14. A method of sampling a fluid, comprising:
providing a tubular body having a cylindrical wall, a first open end and a second open end;
connecting a first mounting cup to the first open end having a seal seat disposed on an inside surface thereof;
connecting a second mounting cup to the second open end having a seal seat disposed on an inside surface thereof;
positioning a first valve assembly having a sealing element to seal against the seal seat in a closed position in the first mounting cup;
positioning a second valve assembly having a sealing element to seal against the seal seat in a closed position in the second mounting cup;
coupling a flexible bag to the first valve assembly and positioning the flexible bag within the tubular body;
coupling a vacuum source to the first valve assembly and the second valve assembly;
depressing the first valve assembly and lifting the sealing element off the seal seat into an open position;
depressing the second valve assembly and lifting the sealing element off the seal seat into an open position;
evacuating the tubular body and the flexible bag;
releasing the second valve assembly and biasing the sealing element against the seal seat into the closed position; and
releasing the first valve assembly and biasing the sealing element against the seal seat into the closed position.

15. The method of claim 14, further comprising:
coupling a fluid source to the first valve assembly;
actuating the first valve assembly into the open position and actuating the second valve assembly into the open position;
drawing a fluid from the fluid source through the first valve assembly and into the flexible bag; and
actuating the first valve assembly into the closed position and actuating the second valve assembly into the closed position.

* * * * *